United States Patent [19]
Schrottle et al.

[11] Patent Number: 6,112,585
[45] Date of Patent: Sep. 5, 2000

[54] TIRE PRESSURE MONITORING DEVICE

[75] Inventors: Michael Schrottle, Neuwilen; Willi Schmidiger, Bounas, both of Switzerland

[73] Assignee: Alpha-Beta Electronics AG, Ellighausen, Switzerland

[21] Appl. No.: 08/708,579

[22] Filed: Sep. 5, 1996

[30]     Foreign Application Priority Data

Sep. 18, 1995 [DE] Germany ............................ 195 34 616

[51] Int. Cl.⁷ .......................... G01M 15/00; B60C 23/00
[52] U.S. Cl. ................................................................ 73/146
[58] Field of Search ................................ 73/8, 146, 146.2,
                                                73/146.3, 146.4, 146.5

[56]                References Cited

U.S. PATENT DOCUMENTS

| 4,376,931 | 3/1983  | Komatu et al.      | 340/58   |
| 4,578,992 | 4/1986  | Galasko et al.     | 73/146.5 |
| 4,978,941 | 12/1990 | Brown              | 73/146.4 |
| 5,289,160 | 2/1994  | Fiorletta          | 73/146.5 |
| 5,297,424 | 3/1994  | Sackett            | 73/146.5 |
| 5,540,092 | 7/1996  | Handefield et al.  | 73/146.5 |
| 5,602,524 | 2/1997  | Mock et al.        | 73/146.5 |
| 5,731,754 | 3/1998  | Lee, Jr. et al.    | 73/146.5 |
| 5,808,190 | 9/1998  | Ernst              | 73/146.4 |
| 5,880,363 | 3/1999  | Meyer et al.       | 73/146.5 |
| 5,883,305 | 3/1999  | Jo et al.          | 73/146.5 |

FOREIGN PATENT DOCUMENTS

| 2 441 502   | 6/1980 | France .  |
| 3104013 A1  | 2/1982 | Germany . |
| WO 93/16891 | 9/1993 | WIPO .    |

*Primary Examiner*—George Dombroske
*Attorney, Agent, or Firm*—Pollock, Vande Sande & Amernick

[57]                 ABSTRACT

A tire pressure monitoring device for a vehicle having several wheels comprises a central receiving and evaluation device at the vehicle. Each a receiving antenna (A, B, C, . . . N) is arranged stationarily at the vehicle structure adjacent to at least each active wheel and thus attributed to said specific wheel. All said receiving antennas (A, B, C, . . . N) being connected via each a distinctive connecting line (a, b, c, . . . n) with a single receiver means. Said receiver means comprises a multiplexer-circuit connecting per time interval only one single selected receiving antenna or several selected receiving antennas with said receiving means. Further, said receiver means sensing a field strength of each specific radiogram and thus selecting said specific receiving antenna comprising the highest field strength of a received radiogram during said specific time interval. Thus, central evaluation means may attribute a specific radiogram to said specific wheel being arranged adjacent to said receiving antenna comprising the highest field strength of a received radiogram during said specific time interval.

40 Claims, 1 Drawing Sheet

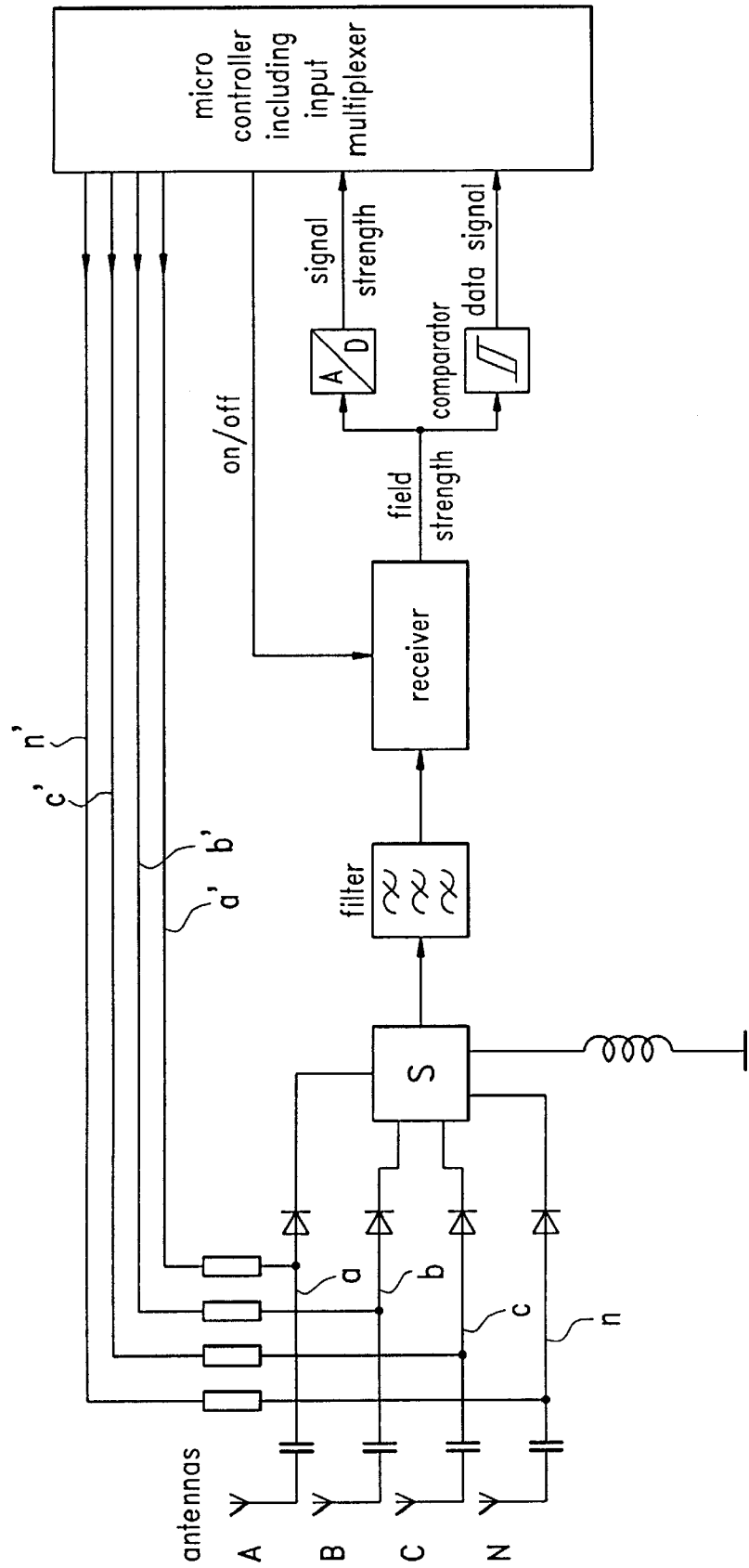

6,112,585

TIRE PRESSURE MONITORING DEVICE

FIELD OF THE INVENTION

The present invention is related to a tire pressure monitoring device comprising a signal generating device at wheel, and each a receiving antenna per wheel, and a transmitter means at each wheel for telemetric transmission of radiograms to the receiving antennas, and a central evaluation means for evaluating the radiograms in order to provide a vehicle driver with informations regarding the conditions of the different tires. Furthermore, the invention is related to a multi-path receiver, in particular to a quadruple receiver or a quintuple receiver for such a tire pressure monitoring device. The tire pressure monitoring device according to the present invention may be used in connection with all land vehicles and aircrafts which are provided with several pneumatic tires. Preferably, the tire pressure monitoring device may be used as a device for monitoring the pressure in the tires of motor vehicles like cars, trucks and buses. In the following, the tire pressure monitoring device according to the present invention is described in connection with a car which is provided with four monitored tires, however, the invention is not restricted to cars. Additionally, the air pressure in the spare wheel may be monitored, if desired.

A tire pressure monitoring device of is known from document DE-C2-39 30 479. According to this document each wheel together with its transmitter device is provided with its own receiver. Each receiver typically comprises a ferrit rod having a receiver antenna and a known receiver circuit. The electrical power need of the receiver circuit may be provided with the power supply of the vehicle. The receiver circuit comprises outputs which are connected by means of connecting lines with an indicator device mounted at the instrument panel or the like of the vehicle. The indicator device includes an evaluation circuit which attributes signal pulses obtained from a specific transmitter/ receiver means to the attributed wheel indication According to the known tire pressure monitoring device the transmitter device at the wheel and the attributed receiver antenna, including receiver circuit are solely coupled by means of the special arrangement of this receiver antenna with respect to the monitored wheel In practice it has been found that this coupling alone is often not sufficient. The transmitter device is disposed at the rotating wheel and is often screened by a wheel rim and a wall of the pneumatic tire. The rotation of the wheel may cause insufficient receiving conditions. Signal effacing may occur for instance by effacing and/or reflections at the location of the receiver antenna. Furthermore, a reliable signal transmission requires such a high signal strength that the radiogram generated by a transmitter device is received not only by the directly adjacent and attributed receiver antenna but also by the other receiver antennas at the vehicle. Finally, it is expensive to provide each wheel with an attributed complete receiver.

Document DE-C2-36 05 097 is related to a device for the determination of values to be measured at wheel sets of vehicles, in particular of airplanes. Regarding large airplanes the length of the connecting line between the sensor at the wheel and a central processing unit effecting the evaluation may be up to 30 m; thus, the number of the lines should be as small as possible. A pressure signal is fed into the connecting line by means of an adjustable transformer, the secondary winding thereof is attributed to a rotating tire portion and the primary winding thereof is attributed to an adjacent stationary tire portion. At a predetermined time an electric supply current is supplied only through one single connecting line and the measuring signal is transmitted by the single line. In order to transmit also the brake temperature of a given wheel in addition to the tire pressure the temperature signal is transmitted through a "wrong" line which is not activated at that time. From this "wrong" line the temperature signal is attributed back to the just activated wheel by means of a multiplexing device. The known system does not provide a telemetric signal transmission, and the problem does not arise to make a selection from several pressure signals received from different wheels and which are simultaneously fed to one receiver means.

Document DE-A1-42 05 911 discloses a device for monitoring the air pressure of pneumatic-tired vehicle wheels. The signal is transmitted in a telemetric manner from each rotating wheel to, for instance, a central receiver. The pressure signals are provided with a characteristic identification code for the respective wheel. The receiver device is provided with a memory wherein these identification codes are stored with respect to each wheel The specific wheel is determined by means of the identity of the telemetrically transmitted and received identification code and the stored identification code. A multiplexer-circuit is not mentioned in connection with the known receiver.

SUMMARY OF THE INVENTION

It is an object of the present invention to provide for a tire pressure monitoring device of the above mentioned type a simply constructed receiver and evaluation means providing a reliable attribution of a radiogram to a specific wheel transmitting the specific radiogram, such that a driver of the vehicle may be informed about the measured values or the warnings being attributed to the correct wheel position.

According to a further object of the present invention a transmitting reliability of said tire pressure monitoring device should be made as high as possible by providing a multi-path reception through at least four receiving antennas.

According to still a further object of the present invention a simply constructed multi-path receiver, in particular a quadruple receiver or a quintuple receiver is to be provided for the tire pressure monitoring device.

According to the present invention, a tire pressure monitoring device for a vehicle having several wheels wherein each wheel is provided with a pneumatic tire, is comprising a signal generating device at each wheel sensing the air pressure within the pneumatic tire and, if desired, additionally the tire temperature and providing corresponding electric pressure signals and optionally temperature signals;

a receiving antenna per wheel arranged stationarily at the vehicle structure adjacent to the attributed wheel;

a transmitter means at each wheel generating a radiogram comprising at least control signals corresponding to the electric pressure signals and, optionally, control signals corresponding to the temperature signals for telemetric transmission of the radiogram to the receiving antennas;

a central evaluation means at the vehicle for evaluating the radiograms in order to provide a vehicle driver with information regarding the condition of the different tires;

wherein all the receiving antennas are connected via a distinctive connecting fine with a single receiver means being coupled with the evaluation device;

the receiver means comprises a multiplexer-circuit connecting per time interval only one single selected receiving antenna or several selected receiving antennas with the receiving means;

further, the receiver means sensing a field strength of each specific radiogram and thus selecting the specific receiving antenna comprising the highest field strength of a received radiogram during the specific time interval; and thus enabling the central evaluation means to attribute a specific radiogram to the specific wheel being arranged adjacent to the receiving antenna comprising the highest field strength of a received radiogram during the specific time interval.

According to a further aspect of the present invention, a multi-path receiver means, especially a quadruple receiver means or a quintuple receiver means, for use with said tire pressure monitoring device is comprising:

a number of receiving antennas wherein each receiving antenna is arranged stationarily at the vehicle structure adjacent to at least each active wheel and thus attributed to the specific wheel;

wherein all the receiving antennas are connected via a distinctive connecting line with a single receiver means being coupled with a central evaluation means;

the receiver means comprises a multiplexer-circuit connecting per time interval only one single selected receiving antenna or several selected receiving antennas with the receiving means;

further, the receiver means senses a field strength of each specific radiogram and thus selects the receiving antenna comprising the highest field strength of a received radiogram during the specific time interval; and thus enabling the central evaluation means to attribute a specific radiogram to the specific wheel being arranged adjacent to the receiving antenna comprising the highest field strength of a received radiogram during the specific time interval.

The time pressure monitoring device according to the present invention requires only one single receiver means independently of the number of the receiving antennas at the vehicle. Even for a car having four active wheels and, thus, for four receiving antennas arranged adjacently to each wheel at the vehicle structure, only one single receiver mean is required. Therefore, three receiver means can be saved with respect to the known tire pressure monitoring device according to DE-C2-39 30 479. In addition, the present invention ensures a reliable attribution of a radiogram to the specific wheel transmitting the radiogram by means of the multiplexer-circuit.

During the time interval of a radiogram and subsequently to selecting the receiving antenna comprising the highest field strength, several receiving antennas and preferably all receiving antennas may be switched into the receiving mode in order to receive the control signals of the radiogram by means of several especially by all receiving antennas, thus providing a multi-path reception which ensures a high transmitting reliability. The attributions between several radiograms and an attributed wheel position may be averaged during a longer time period comprising at least several successive radiograms of a specific wheel thus increasing a hit reliability of attribution from radiogram to the subsequent radiogram(s).

Furthermore, this preferred embodiment of the present invention provides a simply constructed multi-path receiver means ensuing high transmitting reliability for the said tire pressure monitoring device.

BRIEF DESCRIPTION OF THE DRAWINGS

The FIGURE is a schematic diagram of an embodiment of the present embodiment

DETAILED DESCRIPTION OF THE INVENTION

The present invention mainly deals with means and devices of the receiving side of the vehicle. The components of the transmitting side at the wheel such as signal generating devices, transmitting devices and the like may comprise known components. For example, these components of the transmitting side may be located at a tire valve as described in documents DE-C2-39 30 479 or DE-C2-43 03 583. Furthermore, the components of the transmitting side may be located at a valve cap to be screwed on the valve tube of a conventional tire valve of a vehicle tire as described in documents DE-C2-39 30 480 or DE-C2-43 03 591. Moreover, the components of the transmitting side may also be fixed at the wheel rim of a vehicle tire as described in other documents. It is important, that these components of the transmitting side generate at the rotating wheel of the vehicle a radiogram in form of a RF signal comprising at least control signals which indicate the most important actual status data of the pneumatic tire, especially the actual tire pressure and, if desired, additionally and optionally the tire temperature.

Typically, the radiogram comprises a modulated RF signal within the megahertz region (MHz), for example frequencies above 200 MHz, preferably frequencies of about 433 MHz or of about 900 MHz are well suited and may be used. Furthermore and preferably, the data to be transmitted telemetrically may be present in the form of digital data, thus enabling an amplitude modulation or a frequency modulation of the carrier frequency according to the digital data. A preferred radiogram may comprise in digital form about 60 to 80 bits. Such a radiogram may comprise a synchronizing code or signal having about 8 to 16 bits, an identification code or signal having typically 32 bits, the control signals having about 4 to 16 bits and a check digit. Typically, a transmission of a radiogram of this type takes from about some microseconds up to some milliseconds. A preferable transmitter means will transmit a radiogram comprising about 80 bits within about 5 milliseconds.

A receiving antenna is attributed to each wheel comprising its own transmitter means. This receiving antenna is stationarily mounted at the vehicle structure adjacent to the attributed wheel, for example in the region of the corresponding wheel case. This receiving antenna is optimized in a known manner in order to receive the aforemention RF signals of the wheel electronic means. The demodulation and the decoding of these signals is performed by the receiver means and the evaluation means. Preferably, the receiver means may be designed for a sensitivity from about minus 100 dBm to about minus 120 dBm.

The receiver means and the evaluation means may be disposed at a central location of the vehicle. This receiver means and evaluation means may be combined into one single unit and then includes the actual receiver as well as an evaluation device in the form of a control device or in the form of a microprocessor; both, the control device and/or the microprocessor comprises several switching devices (decoding) and logical elements. Further, these switching devices include a multiplexer-circuit. This unit may be arranged for example in the luggage trunk of a vehicle. Connecting lines for the signal transmittance connect this unit with an instrument panel or to the interface of a board computer of the vehicle. According to an alternative embodiment, one single receiver means may be provided which is connected with a spatially separated evaluation device by means of connecting lines.

According to an essential feature of the present invention all receiving antennas are attributed to only one single receiver means. A connecting line leads from each receiving antenna (in the following: "antenna") to the receiver means. Depending on the arrangement of the receiver means or of the central unit comprising the receiver means, these connecting lines may comprise different lengths which may lead to a corresponding different attenuation of the signals transmitted through the connecting line. In such a case the measured field strengths are additionally evaluated (for example by means of a microprocessor) in order to compensate such attenuations which are caused by the equipment. Typically, with respect to the scope of the invention it is not required to provide amplifiers on the way from the antenna to the receiver means.

A switching means is inserted into each connecting line. Typically, switching times less than 1 microsecond are required; therefore, preferred switching means comprises diodes or transistors, Each switching means is controlled by the multiplexer-circuit according to a time-controlled multiplex system in order to connect a specific antenna with the receiver means (turning-on) or to disconnect a specific antenna from the receiver means (cutting off).

Multiplexer-circuits are known in the state of the art and need not be described here in detail. A multiplexer-circuit which is particularly suited for the present invention typically includes several switches and a control unit, for example, like a microprocessor in order to control these switches in a suitable manner. In contrast to known multiplexer-circuits or multiplex switching boards which typically maintain only one single switch in the turning-on state per time interval the present invention preferably uses a multiplexer-circuit which may maintain several switches or all the switches in the turning-on state during a specific time interval.

Basically, there are several possibilities of scanning and registering the field strength present at each antenna in order to select the one antenna having the highest field strength per time interval. For this purpose, each antenna may for instance be controlled one after the other in the time controlled multiplex method, and the field strength present at each antenna may be determined, stored and compared to each other in order to determine that antenna having the highest field strength. In this context the invention is not restricted to a specific method of determining the antenna having the highest field strength.

Preferably, an adding method is used wherein two different antennas are simultaneously switched to one summing junction. In this case, a so-called "diversity receiver" is formed, i. e. the RF signal is captured at two different locations (antennas). Besides the actual function of the wheel attribution, this method provides the additional advantage of a higher receiving reliability if a specific transmitter is unfavorably positioned with respect to the antenna (field effacing by reflections). In this case the following functions may be realized by a suitable evaluation device which comprises a microprocessor in addition to the summing junction, the receiver means and the multiplexer-circuit:

Each antenna is scanned one after the other by means of the multiplexer-circuit in the time controlled multiplex method with respect to the field strength which is present at this specific antenna;

if a field strength worth to be received is registered at a specific antenna, this antenna is selected;

in synchronization with each data bit, another antenna of the residual antennas is connected with the receiver means;

at the summing junction a simultaneously fed RF power of two antennas is added;

it is determined by a comparison of the field strengths ("A" and ("A+B")) which antenna (A or B) comprises the highest field strength;

with respect to the next bit period the stronger antenna (A or B) remains in the turning-on state as the selected antenna;

these steps are repeated for the other antennas in order to finally select that antenna comprising the highest field strength.

According to this method the receiver means may approach the maximum reception signal during each bit period without loosing any data bit since the reception conditions are improved with each selection. Once, the strongest antenna is determined, the resulting wheel attribution may further be verified and corrected up to the last bit of a radiogram Preferably, each radiogram may additionally comprise a characteristic identification code for each wheel and its transmitter device which may additionally contribute to this further verification. Thus, the likelihood of a misinterpretation decreases from bit to bit within a radiogram and from one radiogram to the subsequent radiogram. As a result, a high hit reliability regarding the attribution of a radiogram to the "transmitting wheel" is achieved by the means of a most simple structure, by means of a small number of components and by a minimum number of radiograms.

The above mentioned method of selecting the antenna comprising the highest field strength may be used during the entire duration of a radiogram. However and preferably, this selection is performed only during the duration of the synchronizing signal of a radiogram. Such a synchronizing signal may include for instance 8 to 16 bits at the staring phase of a radiogram. This synchronizing signal does not yet comprise any data information regarding the control signals. Even if some bits of the synchronizing signal are lost during the selecting process, a correct wheel attribution may be achieved by evaluating the synchronizing signal. In this case the decoding and evaluation of the control signals may be performed when the attribution of the radiogram to a specific wheel is finally established.

According to a further advantageous embodiment of the present invention, once the attribution of a specific radiogram to its originating wheel has been finally established, during the subsequent phase of this radiogram all the antennas may simultaneously be connected to the receiver means, especially during the subsequent decoding and evaluation of the remaining parts of this radiogram, particularly during the decoding and evaluation of the control signals. This kind of switching and controlling mode substantially increases the transmitting reliability because possible signal effacing effected at one antenna due to the wheel rotation or the like is compensated by an undisturbed reception of the same radiogram at one or more other antenna(s).

Thus, and according to a preferred embodiment of the present invention, the multiplexer-circuit may set only one single switch or only a limited number, for example, two switches into the connecting state (turning-on state) during a predetermined time interval during the reception of a radiogram for the purpose of identification (selecting the antenna of highest field strength) and attributing a specific radiogram to its originating wheel and may set later on several switches or all the switches simultaneously into the connecting state at least during the reception of the control signals of the same radiogram.

For instance, it may be provided that the multiplexer-circuit transferring several switches or all switches into the on-state before a radiogram has been received;

continuously transferring one switch after the other into the off-state subsequently to receiving a radiogram and especially during the evaluation of its synchronizing signal until the antenna with the strongest RF signal has been determined; and then transferring several switches or all switches into the on-state during the reception of the control signal of this radiogram in order to thereby achieve a multi-path reception of this control signal through several antennas.

In this case, the number of connected antennas is continuously decreased during the evaluation of the synchronizing signal until the antenna having the highest field strength has been determined.

According to an alternative controlling and switching mode, it may be provided that the multiplexer-circuit transfers only one single switch or only two switches one after the other into the on-state during the transmission of a synchronizing signal of a specific radiogram; and that the multiplexer-circuit transfers several switches or all switches into the on-state during the subsequent transmission of the control signal of the same radiogram in order to thereby achieve a multi-path reception of this control signal through several antennas.

The drawing shows a switching diagram of a multi-path receiver assembly according to a preferred embodiment of the present invention. This drawing and the following example serve for further explanation of the present invention and may be no means construed to limit the scope of the present invention.

A receiver means and evaluation device according to a preferred embodiment of the present invention may for example comprise an assembly as shown in the switching diagram of FIG. 1. For a passenger car comprising four active wheels, four receiving antennas A, B, C, N are provided. From each antenna A, B, C, N one connecting line a, b, c, n leads to a summing junction S. Into each connecting line a, b, c, n a diode acting as a switch or a transistor acting as a switch is inserted. The receiver means and the evaluation device are provided with a microcontroller equipped with an input multiplexer-circuit. From the microcontroller several control lines a', b', c', n' lead to the attributed connecting line a, b, c, n in order to control the corresponding switch and to transfer one switch or more switches into the off-state or into the on-state. Thus, the microcontroller may record which antenna is switched on the summing junction during a specific time interval The summing junction is connected with the receiver means via a filter. The receiver means not only demodulates the radiogram, but also senses the field strength which is present at the summing junction during a specific time interval. The field strength initially determined in analog form is converted into a digital field strength sign by means of an analog-digital converter and is supplied to the microcontroller for evaluation purposes. After a corresponding demodulation, the control signals are supplied to the microcontroller through a data signal line, and the control signals are evaluated.

What is claimed is:

1. A tire pressure monitoring device for a vehicle having several wheels, wherein each wheel is provided with a pneumatic tire, comprising:

a signal generating device at each wheel sensing the air pressure within the pneumatic tire and providing corresponding electric pressure signals;

a receiving antenna per wheel arranged stationarily at the vehicle structure adjacent to the wheel, and being connected via a distinctive connecting line with a single receiver;

a switch being inserted into each connecting line;

a transmitter at each wheel generating a radiogram comprising at least a synchronizing signal and control signals corresponding at least to the electric pressure signals for telemetric transmission of said radiogram to said receiving antennas;

said single receiver:

sensing a field strength of the synchronizing signal of each specific radiogram, selecting said specific receiving antenna having the highest field strength of a received radiogram during a specific time interval, and attributing the specific radiogram to said specific wheel being arranged adjacent to said receiving antenna comprising the highest field strength of the received radiogram during said specific time interval;

a central evaluation means coupled with said single receiver for obtaining the radiograms and evaluating the control signals thereof in order to provide a vehicle driver with information regarding the condition of different tires; and a multiplexer circuit communicating with said single receiver and actuating said switch according to a time-controlled multiplex method, wherein said multiplexer circuit transfers a number of switches into the ON state before a radiogram has been received;

continuously transfers one switch after the other into the OFF state after the arrival of a radiogram and during the evaluation of its synchronizing signal until the receiving antenna comprising the strongest RF signal has been determined; and then transfers a number of switches into the ON state during the subsequent reception of the control signal of this same radiogram in order to provide a multi-path reception of this control signal by the receiving antennas at the single receiver.

2. The tire pressure monitoring device according to claim 1, wherein the radiogram is an RF signal modulated with a digital signal comprising at least said synchronizing signal and at least said control signals; and the receiving antennas and the single receiver being designed for the reception of said RF signal; and the evaluation means being designed for the evaluation of said digital signal.

3. The tire pressure monitoring device according to claim 2, wherein the synchronizing signal comprises about 8 to 16 bits.

4. Multi-path receiver according to claim 2, wherein said digital signal also includes an identification code.

5. The tire pressure monitoring device according to claim 1, wherein each switch comprises a diode.

6. The tire pressure monitoring device according to claim 1, wherein each switch comprises a transistor.

7. The tire pressure monitoring device according to claim 1, wherein each
connecting line is connected to a common summing junction behind each switch, the field strengths formed at the summing junction being submitted to the single receiver; and the
field strength present at the receiver being converted into a digital field strength signal by an analog-digital converter.

8. Tire pressure monitoring device according to claim 7, wherein the
receiver includes the multiplexer circuit and the summing junction and further comprises a microprocessor tangibly embodying a program of instructions executed by the microprocessor to perform the following functions in order to select said specific receiving antenna comprising the highest field strength of a received radiogram:

scanning each antenna one after the other by means of the multiplexer circuit in a time-controlled multiplex method with respect to the field strength present at a specific receiving antenna;
if a field strength worth to be received is registered at a specific receiving antenna, this specific receiving antenna being selected;
in synchronization with each data bit, another antenna of the residual receiving antennas being connected with the receiver;
at the summing junction a simultaneously fed RF power of two receiving antennas being added;
determining by a comparison of the field strengths which receiving antenna comprises the highest field strength;
with respect to the next bit period the stronger receiving antenna remains in the turning ON state as the selected receiving antenna; and
repeating these steps for other receiving antennas in order to finally select the specific receiving antenna comprising the highest field strength.

9. Multi-path receiver according to claim 1, wherein the signal generating device also senses the tire temperature and the control signals include electric signals corresponding to the tire temperature.

10. A tire pressure monitoring device for a vehicle having several wheels wherein each wheel is provided with a pneumatic tire, comprising:

a
signal generating device at each wheel sensing the air pressure within the pneumatic tire and providing corresponding electric pressure signals;
a receiving antenna per wheel arranged stationarily at the vehicle structure adjacent to the wheel, and each being connected via a distinctive connecting line with a single receiver;
a switch being inserted into each connecting line;
a transmitter at each wheel generating a radiogram comprising at least a synchronizing signal and control signals corresponding at least to the electric pressure signals for telemetric transmission of said radiogram to said receiving antennas;
said single receiver:
sensing a field strength of the synchronizing signal of each radiogram,
selecting a specific receiving antenna comprising the highest field strength of a received radiogram during a specific time interval, and
attributing a specific radiogram to said wheel being arranged adjacent to said specific receiving antenna comprising the highest field strength of the received radiogram during said specific time interval;
a central evaluation means coupled with said single receiver for obtaining the radiograms and evaluating the control signals thereof in order to provide a vehicle driver with information regarding the condition of the tires; and
a multiplexer circuit integrated within said single receiver and actuating said switch according to a time-controlled multiplex method,
wherein
said multiplexer circuit
transfers one after the other only one single switch into the ON state during the reception of a synchronizing signal of the radiogram until the receiving antenna comprising the strongest RF signal has been determined; and
transfers several switch means into the ON state during reception of the control signal of this radiogram in order to provide a multi-path reception of the control signal by the receiving antennas, at the single receiver.

11. The tire pressure monitoring device according to claim 10, wherein the radiogram is an RF signal modulated with a digital signal comprising at least said synchronizing signal and at least said control signals;
the receiving antennas and the single receiver being designed for the reception of said RF signals; and
the
evaluation means being designed for evaluation of said digital signals.

12. The tire pressure monitoring device according to claim 11, wherein the synchronizing signal comprises about 8 to 16 bits.

13. Multi-path receiver according to claim 11, wherein said digital signal also includes an identification code.

14. The tire pressure monitoring device according to claim 10, wherein each switch comprises a diode.

15. The tire pressure monitoring device according to claim 10, wherein each switch comprises a transistor.

16. The tire pressure monitoring device according to claim 10, wherein each
connecting line is connected to a common summing junction behind each switch, the field strengths formed at the summing junction being submitted to the single receiver; and the
field strength present at the receiver being converted into a digital field strength signal by an analog-digital converter.

17. The tire pressure monitoring device according to claim 16, wherein the
receiver includes the multiplexer circuit and the summing junction and further comprises a microprocessor tangibly embodying a program of instructions executable by the microprocessor to perform the following functions in order to select said specific receiving antenna comprising the highest field strength of the received radiogram:

scanning each receiving antenna one after the other by the multiplexer circuit in a time-controlled multiplex method with respect to the field strength present at each receiving antenna;

if a field strength worth to be received is registered at a specific receiving antenna, this receiving antenna being selected;

in synchronization with each data bit, another antenna of the residual receiving antennas being connected with the receiver means;

at the summing junction a simultaneously fed RF power of two receiving antennas being added;

determining by a comparison of the field strengths which receiving antenna comprises the highest field strength;

with respect to the next bit period the stronger receiving antenna remains in the turning ON state as the selected receiving antenna;

repeating these steps for the other receiving antennas in order to finally select the specific receiving antenna comprising the highest field strength.

18. Multi-path receiver according to claim 10, wherein the signal generating device also senses the tire temperature and the control signals include electric signals corresponding to the tire temperature.

19. Multi-path receiver according to claim 10, wherein the multiplexer transfers only two switches into the ON state during reception of the synchronizing signal.

20. A multi-path receiver for use with a tire pressure monitoring device comprising:

a number of receiving antennas for receiving telemetrically transmitted radiograms comprising at least a synchronizing signal and at least control signals related to the tire pressure wherein each receiving antennas is arranged stationarily at the vehicle structure adjacent to at least each active wheel;

all said receiving antennas being connected via a distinctive connecting line with a single receiver;

a switch being inserted into each connecting line;

a multiplexer circuit integrated within said single receiver and actuating said switch according to a time-controlled multiplex method, wherein said multiplexer circuit transfers a number of switches into the ON state before the radiogram has been received;

continuously transfers one switch after the other into the OFF state after the arrival of the radiogram and during the evaluation of its synchronizing signal until the receiving antennas comprising the strongest RF signal has been determined; and transfers a number of switches into the ON state during the subsequent reception of the control signal of this radiogram in order to provide a multi-path reception of the control signal by the receiving antennas at a single receiver.

21. The multi-path receiver according to claim 20, wherein the radiogram is an RF signal modulated with a digital signal comprising at least said synchronizing signal and at least said control signals; and said synchronizing signal comprises about 8 to 16 bits.

22. Multi-path receiver according to claim 21, wherein said digital signal also includes an identification code.

23. The multi-path receiver according to claim 20, wherein each switch comprises a diode.

24. The multi-path receiver according to claim 20, wherein each switch comprises a transistor.

25. The multi-path receiver according to claim 20, wherein each connecting line is connected to a common summing junction behind each switch;

the field strengths formed at the summing junction being submitted to the single receiver; and the field strength present at the single receiver being converted into a digital field strength signal by an analog-digital converter.

26. The multi-path receiver according to claim 25, wherein said single receiver comprises the summing junction, the multiplexer circuit, and a microprocessor and performs the following functions:

scanning each antenna one after the other by means of the multiplexer circuit in a time-controlled multiplex method with respect to the field strength present at a specific receiving antenna;

if a field strength worth to be received is registered at the specific receiving antenna, this receiving antenna being selected;

in synchronization with each data bit, another antenna of the residual receiving antennas being connected with the receiver;

at the summing junction a simultaneously fed RF power of two receiving antennas being added;

determining by a comparison of the field strengths of the selected receiving antenna and the summed antennas which receiving antenna comprises the highest field strength;

with respect to the next bit period the stronger receiving antenna remains in the turning ON state as the selected receiving antenna;

repeating these steps for the other receiving antennas in order to finally select that specific receiving antenna comprising the highest field strength.

27. Multi-path receiver according to claim 20, wherein the receiver comprises four receiving antennas; and each of these receiving antennas being attributed to an active wheel of a car.

28. Multi-path receiver according to claim 20, wherein the signal generating device also senses the tire temperature and the control signals include electric signals corresponding to the tire temperature.

29. A multi-path receiver for use with a tire pressure monitoring device comprising:

a number of receiving antennas for receiving telemetrically transmitted radiograms comprising at least a synchronizing signal and at least control signals related to the tire pressure wherein each receiving antenna is arranged stationarily at the vehicle structure adjacent an active wheel and thus attributed to said specific wheel;

all said receiving antennas being connected via each a distinctive connecting line with a single receiver;

a switch being inserted into each connecting line;

a multiplexer circuit integrated within said single receiver and actuating said switch according to a time-controlled multiplex method, wherein the multiplexer circuit transfers one after the other only one single switch into the ON state during reception of a synchronizing signal of the radiogram until the receiving antenna comprising the strongest RF signal has been determined; and then transfers a number of switches into the ON state during the subsequent reception of the control signal of this same radiogram in order to provide a multi-path reception of this control signal by the receiving antennas at the single receiver.

30. The multi-path receiver according to claim 29, wherein
the radiogram is an RF signal modulated with a digital signal comprising at least said synchronizing signal and at least said control signals; and
said synchronizing signal comprises about 8 to 16 bits.

31. Multi-path receiver according to claim 30, wherein said digital signal also includes an identification code.

32. The multi-path receiver according to claim 29, wherein each switch comprises a diode.

33. The multi-path receiver according to claim 29, wherein each switch comprises a transistor.

34. The multi-path receiver according to claim 29, wherein
each connecting line is connected to a common summing junction behind each switch;
the field strengths formed at the summing junction are submitted to the single receiver; and
the field strength present at the single receiver is converted into a digital field strength signal by an analog-digital converter.

35. The multi-path receiver according to claim 34, wherein
said single receiver comprises the summing junction, the multiplexer circuit, and a microprocessor and performs the following functions:
scanning each antenna one after the other by means of the multiplexer circuit in a time-controlled multiplex method with respect to the field strength present at a specific receiving antenna;
if a field strength worth to be received is registered at the specific receiving antenna, this receiving antenna being selected;
in synchronization with each data bit, another antenna of the residual receiving antennas being connected with the receiver;
at the summing junction a simultaneously fed RF power of two receiving antennas being added;
determining by a comparison of the field strengths at the selected receiving antenna and the summed antennas which receiving antenna comprises the highest field strength;
with respect to the next bit period the stronger receiving antenna remains in the turning ON state as the selected receiving antenna;
repeating these steps for the other receiving antennas in order to finally select that specific receiving antenna comprising the highest field strength.

36. The multi-path receiver according to claim 29, wherein
the receiver comprises four receiver antennas; and
each of these receiving antennas is attributed to an active wheel of a car.

37. Multi-path receiver according to claim 29, wherein the control signal also relates to the temperature.

38. Multi-path receiver according to claim 29, wherein the multiplexer transfers only two switches into the ON state during reception of the synchronizing signal.

39. The tire pressure monitoring device according to claim 1, wherein said multiplexer circuit is attributed to said single receiver.

40. The tire pressure monitoring device according to claim 10, wherein said multiplexer circuit is attributed to said single receiver.

* * * * *